US006969289B2

United States Patent

(12) United States Patent
Hultsch et al.

(10) Patent No.: US 6,969,289 B2
(45) Date of Patent: Nov. 29, 2005

(54) MARINE VESSEL PROPULSION WITH A THRUST BEARING

(75) Inventors: Hartmut Hultsch, Königsbrunn (DE); Karl-Heinz Merk, Augsburg (DE)

(73) Assignee: RENK Aktiengesellschaft, Augsburg (DE)

(*) Notice: Subject to any disclaimer, the term of this patent is extended or adjusted under 35 U.S.C. 154(b) by 0 days.

(21) Appl. No.: 10/792,530

(22) Filed: Mar. 3, 2004

(65) Prior Publication Data

US 2004/0198111 A1 Oct. 7, 2004

(30) Foreign Application Priority Data

Mar. 5, 2003 (DE) ................................ 103 09 420

(51) Int. Cl.[7] ................................ B63H 21/30

(52) U.S. Cl. ................................ 440/111; 440/52; 440/75; 384/99

(58) Field of Search ................................ 440/52, 111, 75, 440/83, 86; 248/573; 384/99, 103, 105, 106

(56) References Cited

U.S. PATENT DOCUMENTS

| | | | |
|---|---|---|---|
| 3,459,395 A * | 8/1969 | Scotto | 248/573 |
| 4,360,349 A * | 11/1982 | Hansson | 440/75 |
| 4,406,633 A * | 9/1983 | Hamm | 440/75 |
| 4,584,928 A * | 4/1986 | Haynes | 248/573 |
| 4,978,320 A * | 12/1990 | Chaplin et al. | 440/111 |

FOREIGN PATENT DOCUMENTS

| | | |
|---|---|---|
| DE | 39 04 141 A1 | 3/1990 |
| DE | 43 26 558 C2 | 2/1995 |
| DE | 196 30 244 C2 | 1/1998 |
| DE | 100 59 196 C1 | 6/2002 |

OTHER PUBLICATIONS

Mannesmann Rexroth, Drucklager Thrust Bearings Axilus Lar RDE 75 510 01.96 pp. 1,7 & 8 (1996).

* cited by examiner

*Primary Examiner*—Lars A. Olson
(74) *Attorney, Agent, or Firm*—Cohen, Pontani, Lieberman & Pavane

(57) ABSTRACT

A marine vessel propulsion assembly has an elastically suspended gearbox with an output drive shaft guided in an axial bearing with a rigidly suspended bearing housing. Free space is provided in the axial bearing for allowing movement of the output drive shaft in the radial direction, wherein the output drive shaft is freely movable radially within the free space. A supporting ring with sliding elements for axial guidance of the output drive shaft is arranged in the axial bearing. The supporting ring is hydraulically supported by a large number of pistons so that the supporting ring can match itself to angular displacements of the output drive shaft and can always completely and uniformly support the sliding elements on the bearing circumference.

4 Claims, 3 Drawing Sheets

20
23
25
2
View III
21

MARINE VESSEL PROPULSION WITH A THRUST BEARING

BACKGROUND OF THE INVENTION

1. Field of the Invention

The present invention relates to marine vessel propulsion assembly having a thrust bearing.

2. Description of the Related Art

Marine vessel thrust bearings and axial bearings for absorbing propeller thrust are either integrated in a generally known manner in a gearbox or arranged as a free-standing thrust bearing on the propeller shaft, depending on the space requirement and the size of the propulsion system.

Gearboxes may be elastically connected to the marine vessel structure for displacement reasons or in order to damp the introduction of structure-borne sound. In propulsion assemblies having elastically supported gearboxes, it is not possible to integrate a thrust bearing for relatively large propeller thrust forces in the gearbox. In this situation, the thrust bearing must be arranged separately on the propeller shaft. FIG. 4 illustrates an arrangement such as this according to the general prior art.

In FIG. 4 a gearbox 20' suspended on elastic elements 21' is connected to a rigidly suspended thrust bearing 23' by an intermediate shaft 24. This configuration requires a relatively large spacing between the thrust bearing 23' and the gearbox 20' to compensate for the displacement of the gearbox 20' with respect to the thrust bearing 23' due to deformation of an intermediate shaft 24. The thrust bearing 23' is arranged in a fixed position. As a rule, the intermediate shaft 24 has a length of several meters, and is linked to the output driveshaft 2' from the gearbox 20' by a flanged connection. The intermediate shaft 24 is linked to the thrust bearing 23' by a further flanged connection, and the propeller side of the thrust bearing 23' is connected to a propeller shaft 25'.

The arrangement of flexible couplings between the bearing and the gearbox makes it possible to reduce the distance, but the couplings result in a large amount of additional weight and considerable additional costs.

Furthermore, very hard elastically separately suspended thrust bearings are generally known to reduce the conduction of structure-borne sound, and these allow compensation for displacement of the gearbox. The propeller thrust is in this case introduced into the marine vessel structure by elastic damping elements which are arranged in the longitudinal direction of the marine vessel. The disadvantage in this case is that the thrust bearing housing must be supported on the outside by additional, heavy and large damping elements, so that a relatively large distance is required between the bearing and the gearbox here as well.

SUMMARY OF THE INVENTION

It is an object of the present invention to provide marine vessel propulsion assembly in which a thrust bearing is arranged in a simple manner closer to an elastically suspended gearbox than in the prior art.

The object of the present invention is met by a combination of hydraulically supported sliding elements with a thrust bearing shaft collar which can move freely radially. This inventive configuration allows the thrust bearing to be advantageously moved close to a gearbox, such that it is free-standing.

Additional elastically damping elements may be provided between the hydraulic supporting elements and the bearing housing to advantageously reduce the conduction of structure-borne sound. The thrust bearing housing may be rigidly attached to the marine vessel structure by reamed bolts, without any additional damping elements being required.

The suspension of the thrust bearing directly adjacent to the gearbox obviates the need for any intermediate shaft or flanged connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
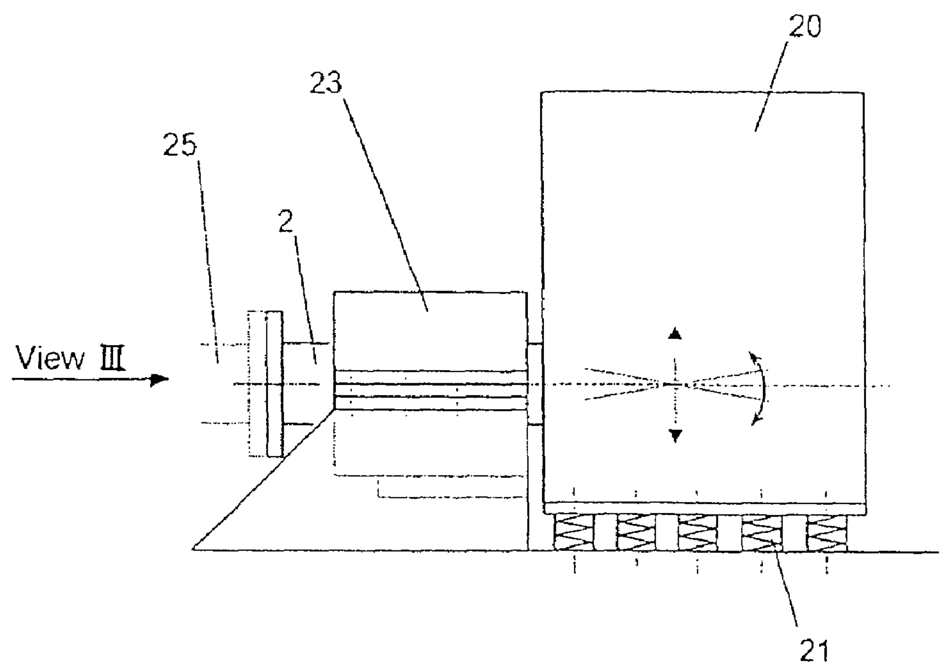
FIG. 1 is a schematic side view of a marine vessel propulsion assembly according to the present invention.

FIG. 1 shows a gearbox 20 which is driven in a generally known manner by an engine or motor that is not illustrated. The gearbox 20 is suspended on elastic elements 21 and is moveable with any displacement of the engine or motor. In the same way, the introduction of structure-borne sound into the marine vessel structure may be damped by the elastic elements 21. The elastic elements 21 allow the output driveshaft 2 from the gearbox to be displaced in the radial direction and/or vary its angular position, as is indicated by the arrows on the gearbox 20. The propeller shaft 25 is connected to the output driveshaft 2 by a flanged connection. An axial bearing 23 is provided to support the axial force generated from the propulsion thrust. This axial bearing 23, also referred to as a thrust bearing 23, supports the output driveshaft 2 from the gearbox 20 and is suspended directly on the gearbox 20. The housing of the thrust bearing 23 is rigidly linked to the marine vessel structure.

Figure 2:
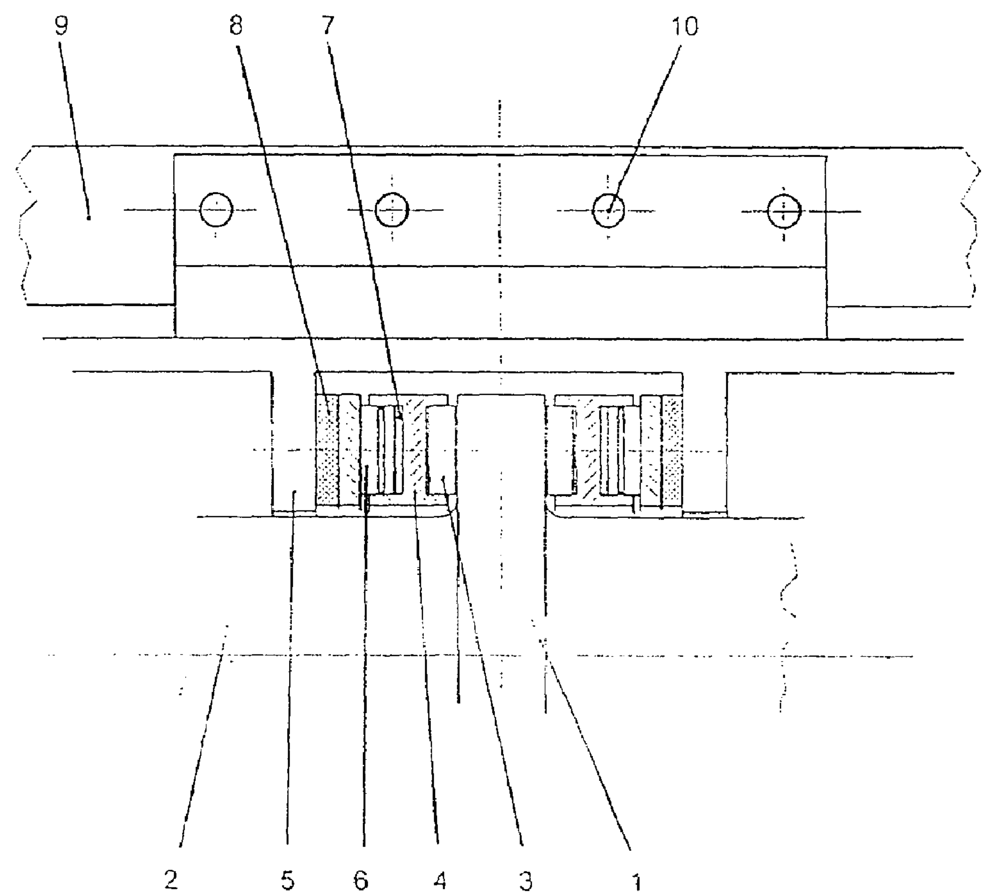
FIG. 2 is a sectional view through a thrust bearing of the marine vessel propulsion assembly of FIG. 1.

To allow the output driveshaft 2 to move with the displacement movements of the gearbox in the thrust bearing 23, the thrust bearing 23 is constructed as illustrated in FIG. 2. The bearing housing 5 is rigidly attached to the marine vessel structure 9 by reamed bolts 10. The output driveshaft 2 is passed through the bearing housing 5 with radial play and has a shaft collar 1 to support the propeller thrust. This shaft collar 1 has a radial free space in the thrust bearing 23, so that the output driveshaft 2 can move freely in the radial direction.

The shaft collar 1 is supported in the axial direction on sliding elements 3, which are supplied with lubricant in a generally known manner, and act as a sliding bearing. The sliding elements 3 are arranged in an annular shape around the output driveshaft 2 in a supporting ring 4, and interact with the bearing surface of the shaft collar 1. The sliding elements 3 are held in appropriate recesses on the supporting ring 4. Further recesses are provided on the other side of the supporting ring 4, into which pistons 6 project, and in each case form a closed variable-volume compression area in the recesses. The rear faces of the pistons 6 are supported with respect to the bearing housing 5. Damping elements 8—preferably hard-elastic damping elements—may be arranged between the pistons 6 and the bearing housing 5. This configuration of the damping elements reduces the introduction of structure-borne sound from the output driveshaft 2 to the housing 5, thereby obviating the need for any corresponding damping devices on the bearing housing 5 itself.

The compression areas which are enclosed by the pistons 6 in the supporting ring 4 are connected to a common pressure line, and are filled with a hydraulic fluid 7. When the output driveshaft 2 is subject to angular displacement, the corresponding area of the shaft collar 1 presses on the sliding elements 3, and hydraulic fluid 7 is pumped out of the affected compression areas in the supporting ring 4 into the common pressure line. For this reasons, the compression areas are preferably flush on the rear face of the bearing surface. The hydraulic fluid 7 which is displaced from the compressed compression areas is distributed by the common pressure line to the other compression areas, so that the sliding elements 3 from which the load has initially been removed are pressed against the shaft collar 1 once again. The connection of the compression areas by the common closed pressure line results in the fluid pressure being the same in all the compression areas. Accordingly, the supporting ring 4 can match itself to an obliquely positioned shaft collar 1 and all of the sliding elements 3 are always supported fully and uniformly over the entire circumference of the bearing.

Sliding elements 3 with the corresponding hydraulic support are preferably provided on both sides of the shaft collar 1 as shown in FIG. 2. This therefore allows both thrust forces and traction forces to be supported.

Since the hydraulic pressure is directly proportional to the axial force and to the propeller thrust, the propeller thrust may be determined by measurement of the pressure. For this purpose, pressure sensors may be provided and connected to a display device which converts the pressure signals directly to the propeller thrust and displays the resulting value. The pressure signals may also be processed in so-called thrust measurement systems.

Figure 3:
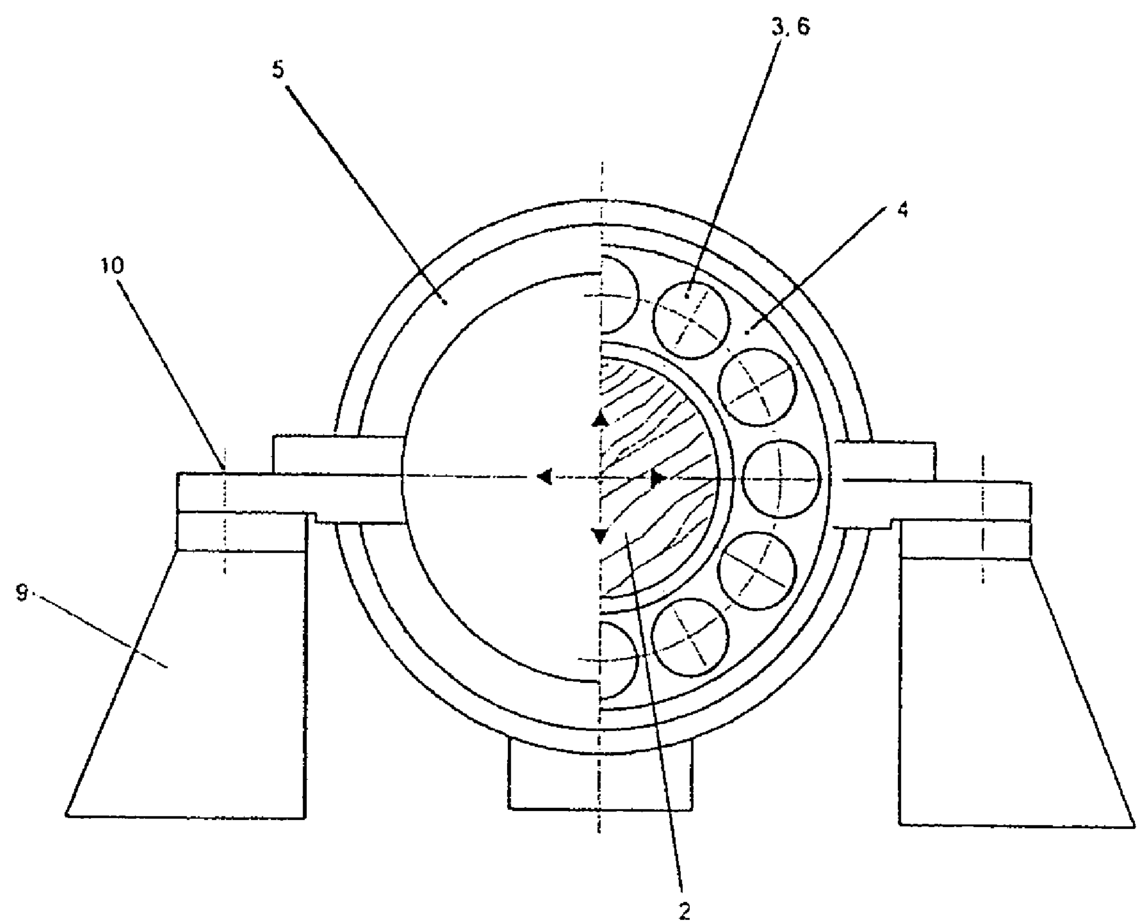
FIG. 3 is a partial sectional view of the thrust bearing along arrow III in FIG. 1.
Figure 4:
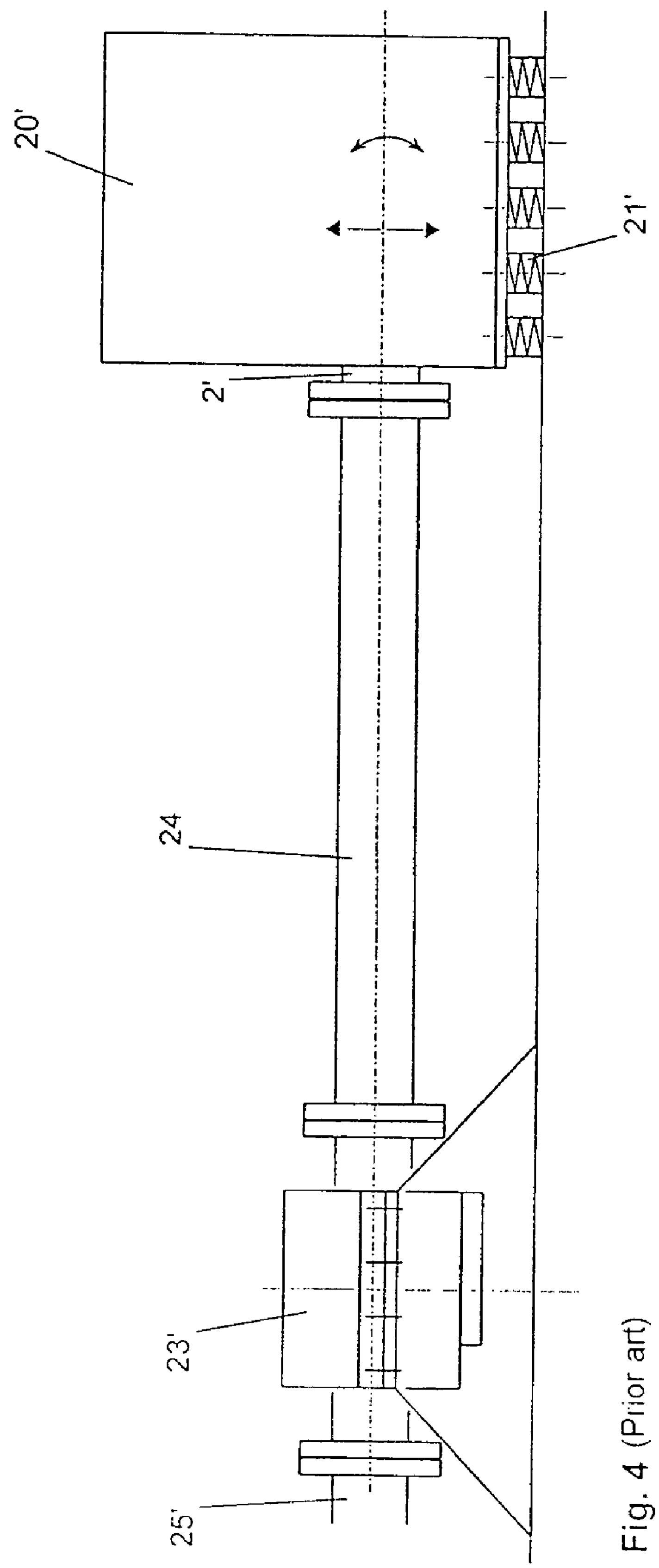
FIG. 4 is a schematic side view of a marine vessel propulsion assembly according to the prior art.

FIG. 3 shows the view III from FIG. 1. The marine vessel structure 9 to which the bearing housing 5 is rigidly attached by reamed bolts 10 is shown in FIG. 3. The bearing housing 5 is illustrated in a partial cut-away in the right-hand half of the drawing, which shows the supporting ring 4 as well as the annular arrangement of the sliding elements 3 and of the hydraulic pistons 6, which are located behind them, around the output driveshaft 2. The displacement plane of the output driveshaft is indicated by arrows on the shaft axis.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A marine vessel propulsion assembly, comprising:

an elastically suspended gearbox having an output drive shaft;

an axial bearing having a rigidly suspended bearing housing, said output drive shaft guided in said axial bearing, wherein said axial bearing defines a radial free space between said axial bearing and said output shaft in which said output shaft is freely radially movable; and a supporting ring arranged in said axial bearing and having sliding elements and hydraulic support pistons, said sliding elements axially guiding said output drive shaft and said hydraulic pistons hydraulically supporting said supporting ring such that said supporting ring matches angular displacements of said output drive shaft and provides uniform axial support of said sliding elements on said output drive shaft.

2. The marine vessel propulsion assembly of claim 1, wherein said output drive shaft comprises a shaft collar and said axial bearing comprises said supporting ring with said sliding elements on both sides of said shaft collar for axially guiding said drive shaft.

3. The marine vessel propulsion assembly of claim 1, wherein said hydraulic support pistons contain hydraulic fluid and a thrust acting on said output drive shaft is determinable from a pressure of the hydraulic fluid in said hydraulic support pistons.

4. A marine vessel propulsion assembly, comprising:

an elastically suspended gearbox having an output drive shaft;

an axial bearing having a rigidly suspended bearing housing, said output drive shaft guided in said axial bearing, wherein said axial bearing defines a radial free space between said axial bearing and said output shaft in which said output shaft is freely radially movable;

a supporting ring arranged in said axial bearing and having sliding elements and hydraulic support pistons, said sliding elements axially guiding said output drive shaft and said hydraulic pistons hydraulically supporting said supporting ring such that said supporting ring matches angular displacements of said output drive shaft and provides uniform axial support of said sliding elements on said output drive shaft; and damping elements for supporting said hydraulic support pistons relative to said bearing housing.

* * * * *